(12) United States Patent
Brace et al.

(10) Patent No.: US 7,963,853 B2
(45) Date of Patent: Jun. 21, 2011

(54) FILAMENT WOUND COMPOSITE SHAFT

(75) Inventors: Michael W. Brace, Maysville, KY (US);
Charles A. Sakers, Odenton, MD (US);
Scott Levy, Columbia, MD (US)

(73) Assignee: KOP-Flex Inc., Hanover, MD (US)

( * ) Notice: Subject to any disclaimer, the term of this patent is extended or adjusted under 35 U.S.C. 154(b) by 672 days.

(21) Appl. No.: 11/986,640

(22) Filed: Nov. 21, 2007

(65) Prior Publication Data
US 2009/0131181 A1 May 21, 2009

(51) Int. Cl.
*F16D 1/064* (2006.01)
(52) U.S. Cl. ........................ 464/181; 464/182
(58) Field of Classification Search ........... 464/181–183
See application file for complete search history.

(56) References Cited

U.S. PATENT DOCUMENTS

| 534,904 | A | * | 2/1895 | Morris | 464/183 |
| 1,924,701 | A | * | 8/1933 | Webb | |
| 4,358,284 | A | * | 11/1982 | Federmann et al. | 464/181 |
| 4,704,918 | A | * | 11/1987 | Orkin et al. | 464/181 X |
| 6,863,763 | B2 | * | 3/2005 | Lee et al. | 464/181 X |

* cited by examiner

*Primary Examiner* — Greg Binda
(74) *Attorney, Agent, or Firm* — Harness, Dickey & Pierce, P.L.C.

(57) ABSTRACT

A shaft may include a first coupling member, a second coupling member, a filament wound shaft member, and a pilot shaft. The first coupling member may couple the shaft to one of a rotationally driving and a rotationally driven component. The second coupling member may be axially spaced from the first coupling member and may couple the shaft to the other of the rotationally driving and the rotationally driven component. The filament wound shaft member may have a first end fixed to the first coupling member, a second end fixed to the second coupling member, and a body portion extending therebetween. The pilot shaft may be disposed radially within the filament wound shaft member and may extend from the first coupling member to the second coupling member.

19 Claims, 4 Drawing Sheets

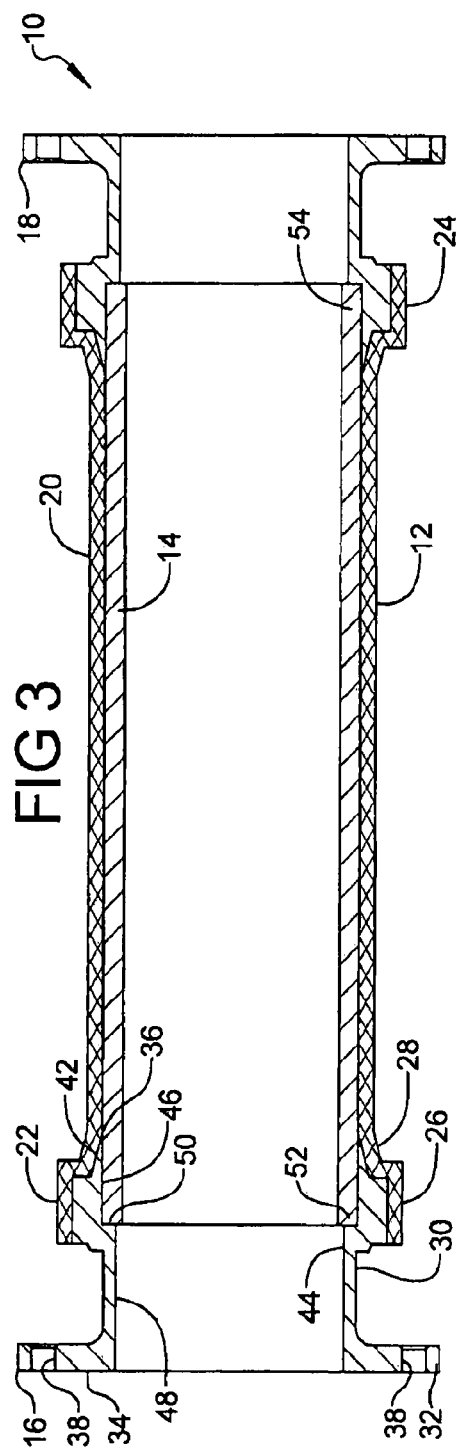
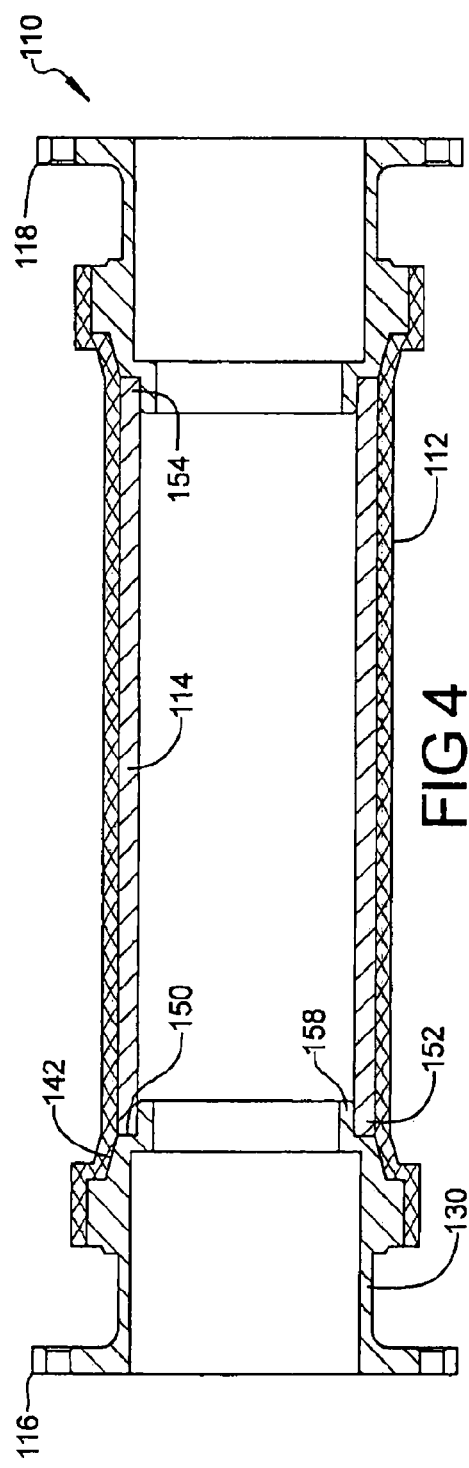

FILAMENT WOUND COMPOSITE SHAFT

FIELD

The present disclosure relates to composite shaft assemblies, and more specifically to filament wound composite shaft assemblies.

BACKGROUND

The statements in this section merely provide background information related to the present disclosure and may not constitute prior art.

Composite shaft assemblies may include a filament wound shaft formed by winding a filament on a mandrel. The filament wound shaft may be cured and removed from the mandrel. The filament wound shaft is typically fixed to first and second flanges at opposite ends thereof. The mounting of the filament wound shaft to the first and second flanges typically involves removal of the filament wound shaft from the mandrel and then fixing the flanges to the filament wound shaft relative to one another to produce a desired shaft length. Typically, when the filament wound shaft fails, or fractures, it may be generally free from radial restraint at an end where the failure occurs.

SUMMARY

Accordingly, a shaft may include a first coupling member, a second coupling member, a filament wound shaft member, and a pilot shaft. The first coupling member may couple the shaft to one of a rotationally driving and a rotationally driven component. The second coupling member may be axially spaced from the first coupling member and may couple the shaft to the other of the rotationally driving and the rotationally driven component. The filament wound shaft member may have a first end fixed to the first coupling member, a second end fixed to the second coupling member, and a body portion extending therebetween. The pilot shaft may be disposed radially within the filament wound shaft member and may extend from the first coupling member to the second coupling member.

A method of forming a shaft may include locating first and second coupling members relative to a spacing member and winding a filament thereabout. The locating may include locating the first and second coupling members on the spacing member to provide a predetermined spacing between the first and second coupling members and to capture the spacing member therebetween. Winding the filament may include winding the filament around portions of the first and second coupling members and the spacing member to form a filament wound portion of the shaft having the spacing member disposed within the filament windings and between the first and second coupling members.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a section view of the composite shaft assembly of FIG. 1;

FIG. 4 is a section view of an alternate composite shaft assembly according to the present disclosure.

DETAILED DESCRIPTION

Figure 1:
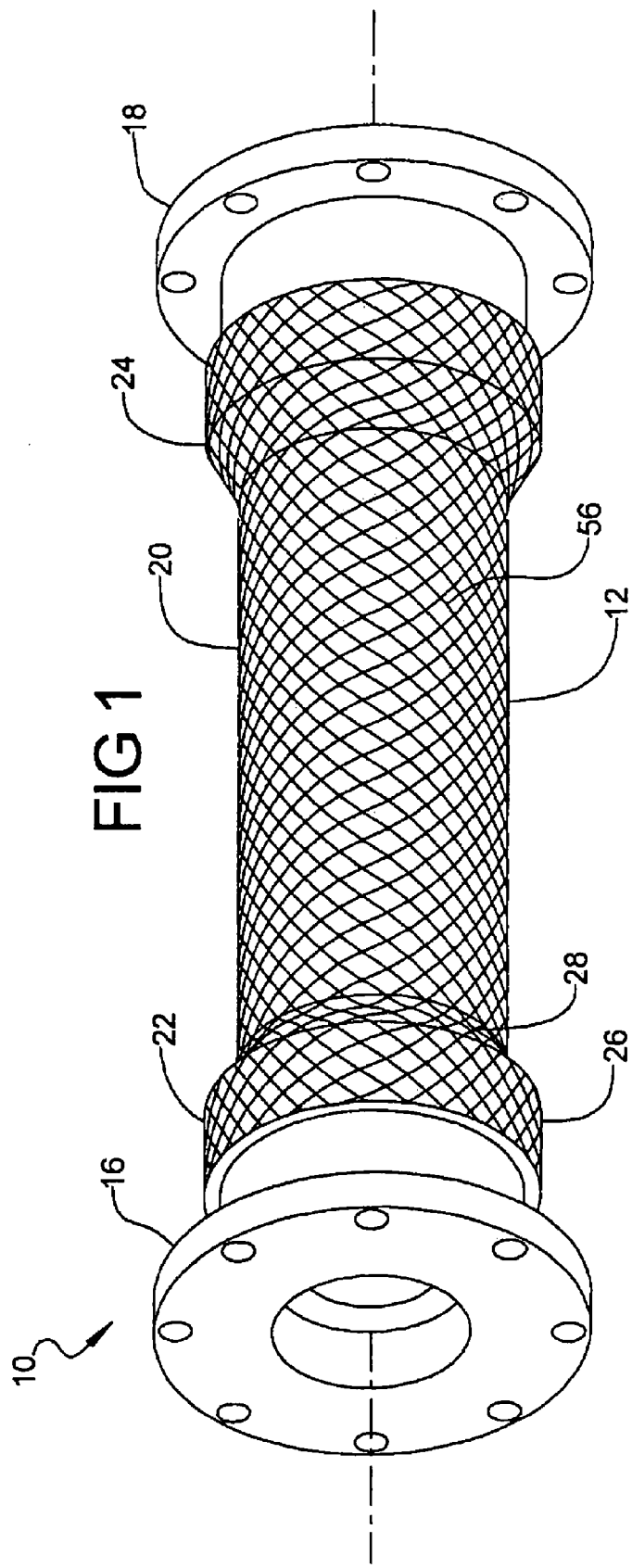
FIG. 1 is a perspective view of a composite shaft assembly according to the present disclosure.

The following description is merely exemplary in nature and is not intended to limit the present disclosure, application, or uses. It should be understood that throughout the drawings, corresponding reference numerals indicate like or corresponding parts and features.

Figure 2:
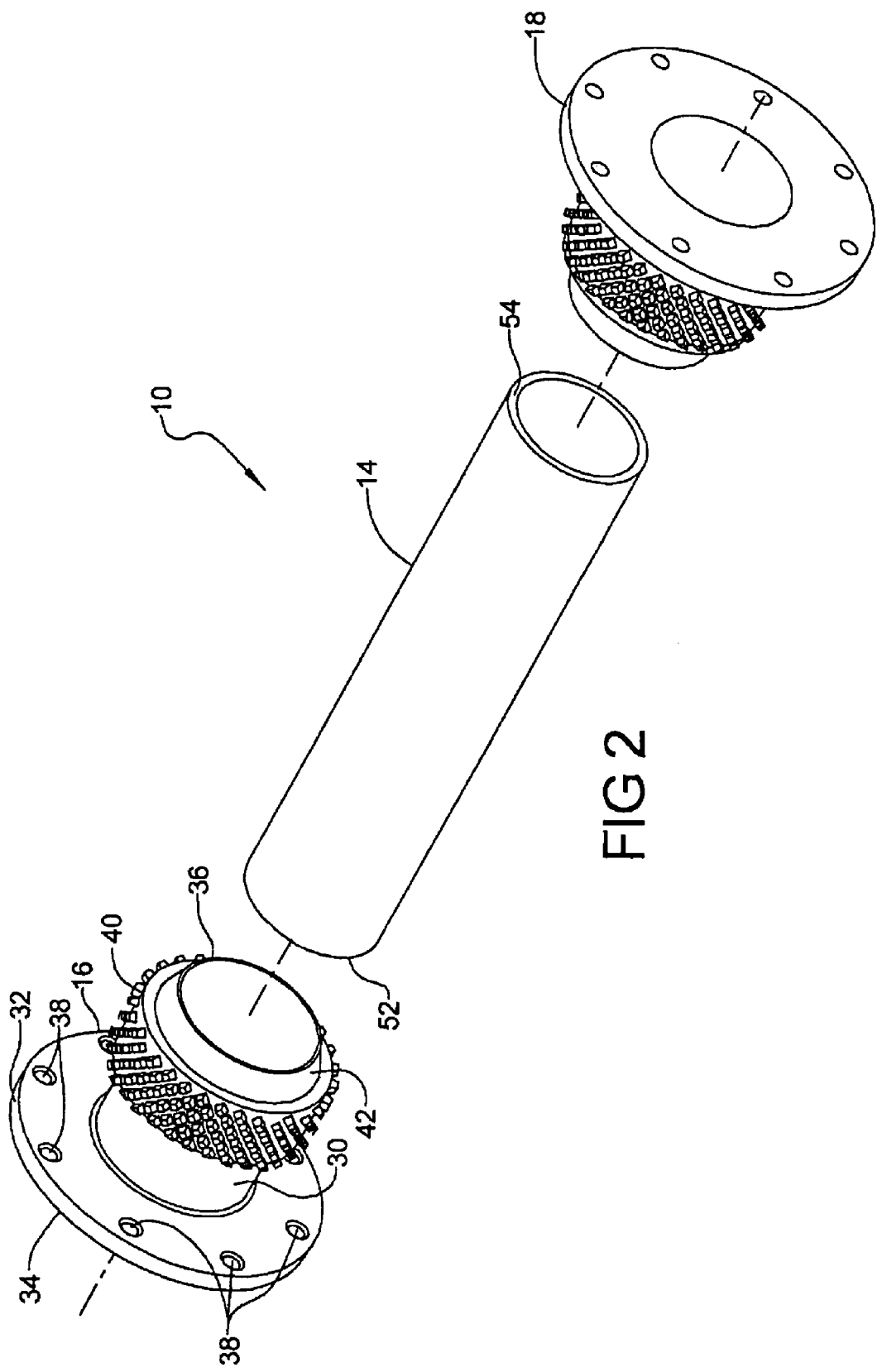
FIG. 2 is a perspective exploded view of components of the composite shaft assembly of FIG. 1.

As shown in FIGS. 1-3, a composite shaft assembly 10 may include a filament wound shaft member 12, a pilot shaft 14, and first and second coupling members 16, 18. Pilot shaft 14 and first and second coupling members 16, 18 may form a support apparatus. Filament wound shaft member 12 may include a generally cylindrical body 20 and first and second end portions 22, 24. First and second end portions 22, 24 may be generally similar to one another, therefore, first end portion 22 will be described with the understanding that the description applies equally to second end portion 24.

First end portion 22 may generally include first and second portions 26, 28. First portion 26 may form an end of filament wound shaft member 12 and may be fixed to first coupling member 16, as discussed below. First portion 26 may have an outer diameter that is greater than an outer diameter of body 20. Second portion 28 may extend at a radially outward angle from body 20 to first portion 26. Second portion 28 may form a region of minimum torsional strength of filament wound shaft member 12, as discussed below.

First and second coupling members 16, 18 may be generally similar to one another, therefore, first coupling member 16 will be described with the understanding that the description applies equally to second coupling member 18. First coupling member 16 may include a generally hollow cylindrical body portion 30 having a radially outwardly extending flanged portion 32 extending from an end thereof to rotationally fix first coupling member 16 to a rotationally driving or a rotationally driven component (not shown). Second coupling member 18 may be used to rotationally fix shaft assembly 10 to the other of the rotationally driving and the rotationally driven component (not shown) in a similar manner. A first end 34 of first coupling member 16 may be located at flanged portion 32 and a second end 36 of first coupling member 16 may be located at an end of body portion 30 generally opposite flanged portion 32. While flanged portion 32 is shown including a series of mounting apertures 38, it is understood that a variety of configurations may be used for mounting shaft assembly 10 to an additional structure, such the rotationally driving or the rotationally driven component (not shown).

Body portion 30 may include an external surface having a plurality of lugs 40 (FIG. 2) extending therefrom to create a series of angularly disposed channels, forming a coupling region. Body portion 30 may include an inwardly sloped outer surface 42 at second end 36 located axially inwardly relative to lugs 40. First coupling member 16 may include a passage 44 therein and extending axially outwardly from second end 36. More specifically, passage 44 may include first and second portions 46, 48. First portion 46 may extend axially outwardly from second end 36 and second portion 48 may extend axially inwardly from first end 34. The inner diameter of first portion 46 may be greater than the inner diameter of second portion 48, forming a stepped region, or stop 50 therebetween.

Pilot shaft 14 may be a generally cylindrical hollow shaft and may include first and second ends 52, 54. Pilot shaft 14 may be formed from a variety of materials including graphite and fiberglass. Pilot shaft 14 may have an outer diameter that is less than the inner diameter of first portion 46 of passage 44 and greater than the inner diameter second portion 48 of passage 44. First end 52 of pilot shaft 14 may define a first annular wall portion extending axially outward beyond an axially inner end of first coupling member 16 and second end 54 of pilot shaft 14 may define a second annular wall portion extending axially outward beyond an axially inner end of second coupling member 18. First end 52 of pilot shaft 14 may abut stop 50, axially locating pilot shaft 14 relative to first coupling member 16. Second end 54 of pilot shaft 14 may similarly be engaged with second coupling member 18. As such, it is understood that the description of first end 52 of pilot shaft 14 relative to first coupling member 16 applies equally to second end 54 of pilot shaft 14 relative to second coupling member 18.

Figure 5:
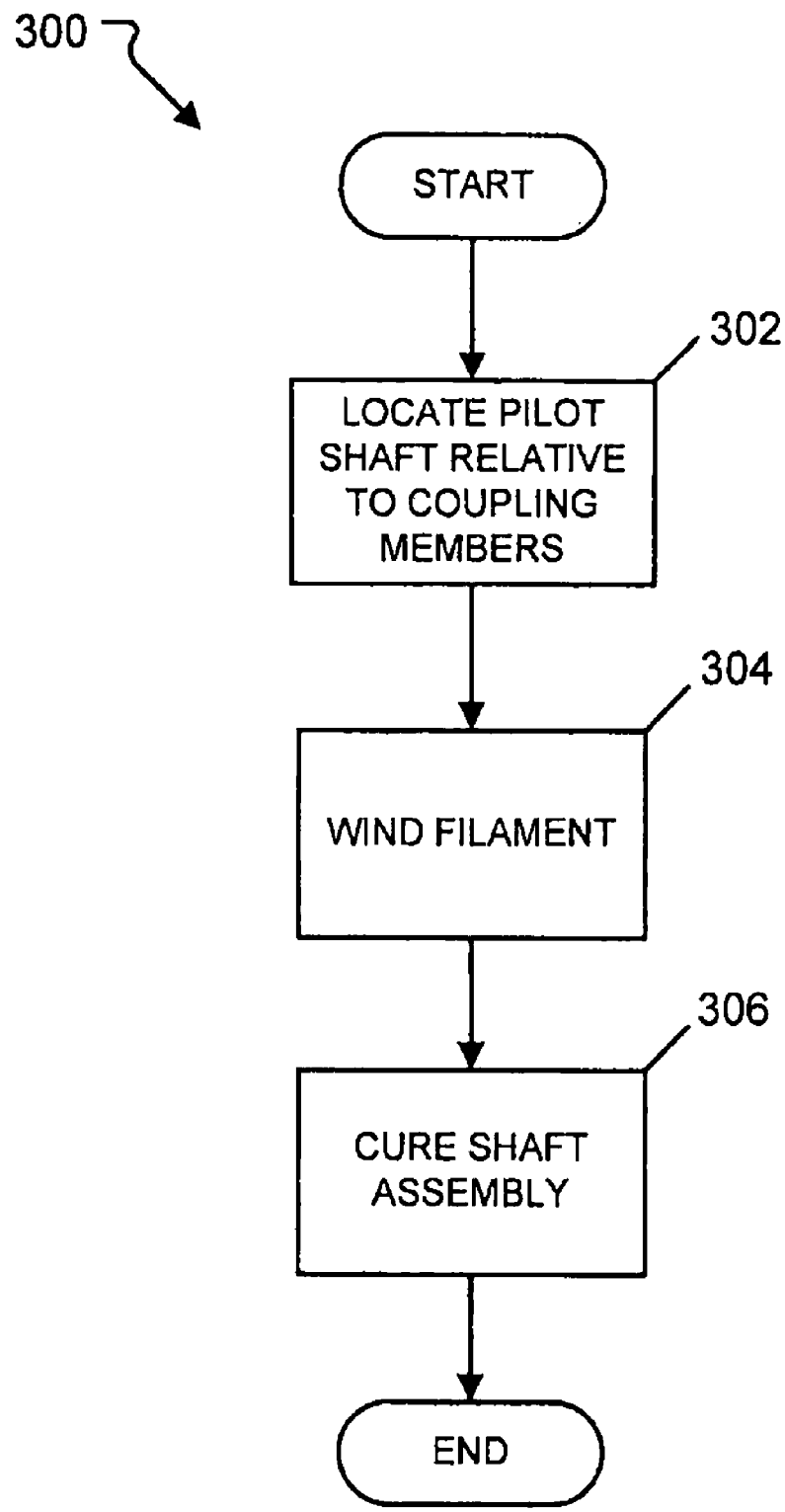
FIG. 5 is a flow diagram of the assembly of the composite shaft assembly of FIG. 1.

With additional reference to FIG. 5, assembly of shaft assembly 10 is generally illustrated by flow diagram 300. During assembly, pilot shaft 14 may be located within first and second coupling members 16, 18, as indicated at step 302, so that first and second ends 52, 54 are located within first and second coupling members 16, 18. More specifically, first and second ends 52, 54 may abut stops 50 within first and second coupling members 16, 18, capturing pilot shaft 14 therebetween and axially locating first coupling member 16 relative to second coupling member 18. More specifically, pilot shaft 14 may provide a repeatable predetermined spacing between first and second coupling members 16, 18. As such, pilot shaft 14 may generally form a spacing member between first and second coupling members 16, 18.

Pilot shaft 14 may be engaged with first and second coupling members 16, 18 in a number of ways, including a coupling with an adhesive between an outer surface of pilot shaft 14 and an inner surface of first and second coupling members 16, 18. Adhesive may be used to couple pilot shaft 14 to first and second coupling members 16, 18. Alternatively, pilot shaft 14 and first and second coupling members 16, 18 may merely have a slip fit engagement therebetween.

Once pilot shaft 14 is located between first and second coupling members 16, 18, filament wound shaft member 12 may be formed thereon. More specifically, first and second coupling members 16, 18 may be axially fixed relative to one another and a filament 56 may be wound around first and second coupling members 16, 18 and pilot shaft 14, as indicated at step 304, to create filament wound shaft member 12. Before winding filament 56, a binding agent, such as a resin, may be applied thereto. Filament 56 may be wound into the angularly disposed channels defined between lugs 40 on first and second coupling members 16, 18 to rotationally and axially couple filament wound shaft member 12 thereto. During winding of filament wound shaft member 12, pilot shaft 14 may be used as a mandrel. After winding of filament 56 to create filament wound shaft member 12, pilot shaft 14 may remain located between first and second coupling members 16, 18. Filament 56 and the resin thereon may be cured to form filament wound shaft member 12, as indicated at step 306. Filament wound shaft member 12 may generally encapsulate pilot shaft 14 therein, retaining pilot shaft 14 as part of shaft assembly 10.

As indicated above, second portion 28 may form a region of minimum torsional strength of filament wound shaft member 12. The engagement between first end 52 of pilot shaft 14 and first coupling member 16 and/or the engagement between second end 54 of pilot shaft 14 and second coupling member 18 may have a torsional strength that is less than the torsional strength of the region of minimum torsional strength of filament wound shaft member 12 (or second portion 28).

During operation of shaft assembly 10, pilot shaft 14 may act as a retaining member for filament wound shaft member 12 upon failure, or fracture, thereof. More specifically, since pilot shaft 14 extends axially between and into first and second coupling members 16, 18, filament wound shaft member 12 is generally supported thereon at a location axially inwardly relative to the region of minimum torsional strength thereof (or second portion 28).

A failure of filament wound shaft member 12 may generally occur at an axial location corresponding to second end 36 of first coupling member 16 (or at a similar location relative to second coupling member 18). Second portion 28 of filament wound shaft member 12 may generally be axially located at or near second end 36 of first coupling member 16. Since the torsional strength of the engagement between pilot shaft 14 and first coupling member 16 may be less than the minimum torsional strength of filament wound shaft member 12, pilot shaft 14 may be rotatable relative to first coupling member 16 when a failure of filament wound shaft member 12 occurs. However, pilot shaft 14 may remain axially retained relative to first and second coupling members 16, 18, retaining the fractured filament wound shaft member 12 thereon due to the axial extent of pilot shaft 14 into both first and second coupling members 16, 18. Therefore, filament wound shaft member 12 may be retained on pilot shaft 14 and pilot shaft 14 may limit radial displacement of filament wound shaft member 12 after a failure thereof. More specifically, body 20 of filament wound shaft member 12 may be bearingly supported on pilot shaft 14 upon failure of filament wound shaft member 12.

An alternate shaft assembly 110 is shown in FIG. 4. Shaft assembly 110 may be generally similar to shaft assembly 10, with the exception of the portions discussed below. Shaft assembly 110 may include a filament wound shaft member 112, a pilot shaft 114, and first and second coupling members 116, 118. Pilot shaft 114 and first and second coupling members 116, 118 may form a support apparatus. First coupling member 116 may have a stop 150 on an outer surface thereof. First coupling member 116 may further include a mounting portion 158 extending axially inwardly relative to a body portion 130 thereof. More specifically, mounting portion 158 may extend axially inwardly relative to an inwardly sloped outer surface 142 of first coupling member 116 and relative to a region of minimum torsional strength of a filament wound shaft member 112.

Pilot shaft 114 may be a generally cylindrical member. A first end 152 of pilot shaft 114 may have an inner diameter that is greater than the outer diameter of mounting portion 158. First end 152 of pilot shaft 114 may define a first annular wall portion extending axially outward beyond an axially inner end of first coupling member 116 and second end 154 of pilot shaft 114 may define a second annular wall portion extending axially outward beyond an axially inner end of second coupling member 118. First end 152 of pilot shaft 114 may abut first coupling member 116, axially locating pilot shaft 114 relative to first coupling member 116. Second coupling member 118 may be generally similar to first coupling member 116 and have a similar engagement with a second end 154 of pilot shaft 114. Therefore, second coupling member 118 and the engagement between second coupling member 118 and second end 154 of pilot shaft 114 will not be described with the understanding that the description of first coupling member 116 and first end 152 of pilot shaft 114 applies equally to second coupling member 118 and second end 154.

It is further understood that assembly and operation of shaft assembly 110 is generally similar to shaft assembly 10. Therefore, the assembly and operation of shaft assembly 110 will not be described with the understanding that the description of the assembly and operation of shaft assembly 10 applies equally to shaft assembly 110, with the exception of an inner surface of pilot shaft 114 being engaged with an outer surface of first coupling member 116 in shaft assembly 110.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A shaft comprising:
   a first coupling member to couple said shaft to one of a rotationally driving and a rotationally driven component;
   a second coupling member axially spaced from said first coupling member to couple said shaft to the other of the rotationally driving and the rotationally driven component;
   a filament wound shaft member having a first end fixed to said first coupling member, a second end fixed to said second coupling member, and a body portion extending therebetween; and
   a pilot shaft disposed radially within said filament wound shaft member and extending from said first coupling member to said second coupling member, said pilot shaft defining a first annular wall portion located on said first coupling member and a second annular wall portion located on said second coupling member, said first annular wall portion extending axially outward beyond an axially inner end of said first coupling member and said second annular wall portion extending axially outward beyond an axially inner end of said second coupling member.

2. The shaft of claim 1 wherein said pilot shaft includes a first end defining said first annular wall portion and engaged with said first coupling member and a second end defining said second annular wall portion and engaged with said second coupling member.

3. The shaft of claim 2 wherein said first coupling member includes a first opening in said axially inner end thereof, said first end of said pilot shaft being disposed within said first opening.

4. The shaft of claim 3 wherein said first opening includes a first stop therein and said first end of said pilot shaft abuts said first stop.

5. The shaft of claim 4 wherein said second coupling member includes a second opening in said axially inner end thereof including a second stop therein, said second end of said pilot shaft being disposed within said second opening and abutting said second stop to provide a predetermined spacing between said first and second coupling members.

6. The shaft of claim 2 wherein said axially inner end of said first coupling member extends into said first end of said pilot shaft.

7. The shaft of claim 6 wherein said first coupling member includes a first stop abutting said first end of said pilot shaft.

8. The shaft of claim 7 wherein said axially inner end of said second coupling member extends into said second end of said pilot shaft and includes a second stop abutting said second end of said pilot shaft to provide a predetermined spacing between said first and second coupling members.

9. The shaft of claim 2 wherein said engagement between said first end of said pilot shaft and said first coupling member has a torsional strength that is less than a minimum torsional strength of said filament wound shaft member.

10. The shaft of claim 9 wherein the minimum torsional strength of said filament wound shaft member is located between a first location where said first end of said filament wound shaft member is fixed to said first coupling member and a second location where said second end of said filament wound shaft member is fixed to said second coupling member.

11. The shaft of claim 1 wherein said pilot shaft defines a hollow body.

12. A shaft comprising:
   a first coupling member to couple said shaft to one of a rotationally driving and a rotationally driven component;
   a second coupling member axially spaced from said first coupling member to couple said shaft to the other of the rotationally driving and the rotationally driven component;
   a filament wound shaft member having a first end fixed to said first coupling member, a second end fixed to said second coupling member, and a body portion extending therebetween; and
   a pilot shaft disposed radially within said filament wound shaft member and extending from said first coupling member to said second coupling member, said pilot shaft including a first end engaged with said first coupling member and a second end engaged with said second coupling member, said engagement between said first end of said pilot shaft and said first coupling member having a torsional strength that is less than a minimum torsional strength of said filament wound shaft member, and the minimum torsional strength of said filament wound shaft member being located between a first location where said first end of said filament wound shaft member is fixed to said first coupling member and a second location where said second end of said filament wound shaft member is fixed to said second coupling member.

13. The shaft of claim 12 wherein said first and second ends of said pilot shaft extend axially beyond axially inner ends of said first and second coupling members.

14. The shaft of claim 13 wherein said first coupling member includes a first opening in said axially inner end thereof, said first end of said pilot shaft being disposed within said first opening.

15. The shaft of claim 14 wherein said first opening includes a first stop therein and said first end of said pilot shaft abuts said first stop.

16. The shaft of claim 15 wherein said second coupling member includes a second opening in said axially inner end thereof including a second stop therein, said second end of said pilot shaft being disposed within said second opening and abutting said second stop to provide a predetermined spacing between said first and second coupling members.

17. The shaft of claim 13 wherein said axially inner end of said first coupling member extends into said first end of said pilot shaft.

18. The shaft of claim 17 wherein said first coupling member includes a first stop abutting said first end of said pilot shaft.

19. The shaft of claim 18 wherein said axially inner end of said second coupling member extends into said second end of said pilot shaft and includes a second stop abutting said second end of said pilot shaft to provide a predetermined spacing between said first and second coupling members.

* * * * *